UNITED STATES PATENT OFFICE.

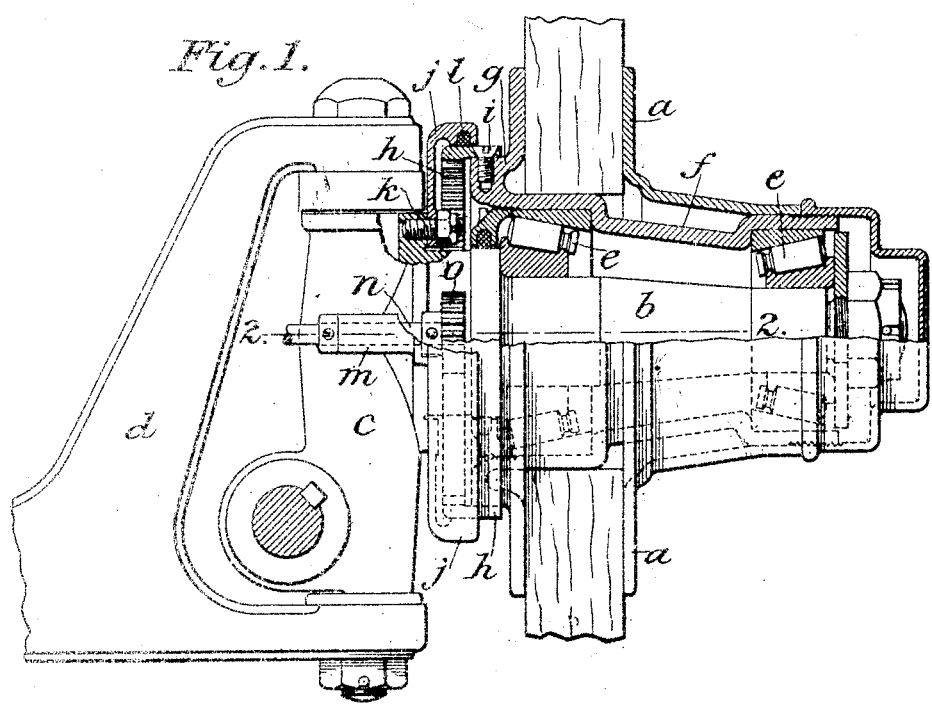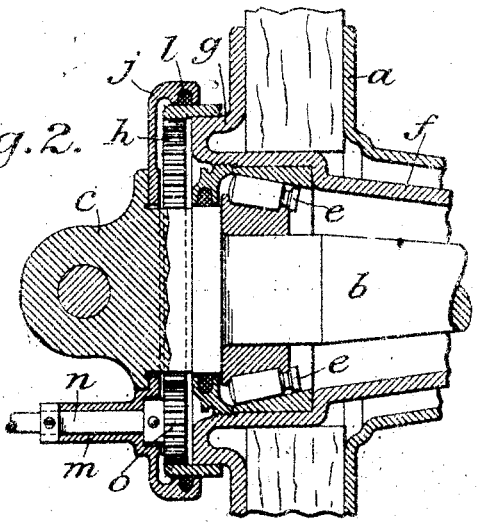

JOHN G. PERRIN, OF DETROIT, MICHIGAN, ASSIGNOR TO MOTOR PATENTS COMPANY, OF DETROIT, MICHIGAN, A CORPORATION OF MICHIGAN.

SPEEDOMETER DRIVING MECHANISM.

1,219,479.

Specification of Letters Patent. Patented Mar. 20, 1917.

Application filed August 3, 1912. Serial No. 713,168.

*To all whom it may concern:*

Be it known that I, JOHN G. PERRIN, a citizen of the United States, residing at Detroit, in the county of Wayne and State of Michigan, have invented certain new and useful Improvements in Speedometer Driving Mechanism, of which the following is a specification.

My invention relates to means for driving a speedometer or other device or apparatus from the hub of a vehicle wheel and the primary object of the invention is to provide means whereby the hub of the wheel may be provided with a driving member that actuates a driven member mounted within a casing adjacent to the wheel hub.

A further object of the invention is to provide a mechanism arranged on the rear portion of the hub adjacent to the steering knuckle, without cutting away or otherwise weakening the steering knuckle or the axle spindle.

A further object of the invention is to provide a compact mechanism for actuating a speedometer or other apparatus which can be quickly assembled, which is readily accessible, and which may be entirely inclosed so as to protect the meshing parts.

The various other objects of my invention will be more fully set forth in the following description of one form of mechanism embodying my invention which consists in the new and novel features of construction and combination of parts hereinafter set forth and claimed.

In the accompanying drawings:—

Figure 1 represents a side elevation, partly in section of a portion of a wheel mounted upon the steering knuckle embodying my improved speedometer driving mechanism.

Fig. 2 represents a detail horizontal section on the lines 2—2 of Fig. 1.

The wheel $a$ may be of any desired construction and is mounted upon the spindle $b$ preferably formed integral with the knuckle $c$ which is supported by the yoke $d$ in any well known or preferable manner. Suitable anti-friction bearings $e$ may be provided between the wheel and the axle if desired.

The rear portion of the hub $f$ adjacent to the steering knuckle is provided with an annular flange $g$. A rearwardly projecting toothed ring or annular gear $h$ is secured to said flange $g$ in any suitable manner as by the screws $i$. A fixed member preferably comprising a protecting cap $j$ is secured to the steering knuckle $c$ in any suitable manner as by the screws $k$ and is formed with an annular flange provided with a packing ring $l$ that engages the exterior of the gear ring $h$. A packing $p$ is positioned between the hub and spindle to prevent dust from working into the gears along the spindle. Said member is provided with a bearing $m$ for a shaft $n$ having a spur gear $o$ mounted thereon which meshes with the gear $h$. The said shaft may be connected in any suitable or well known manner with a speedometer or other driven mechanism.

In operation, the rotation of the hub is directly transmitted to the spindle $n$ through the gears $h$ and $o$. Consequently, lost motion is reduced to a minimum and an accurate register can be obtained. To disassemble the parts, the wheel $a$ is removed, which permits access to or removal of the gear $h$ and of the cap $j$, together with the spur gear $o$. When the wheel is replaced upon the spindle, the gears $h$ and $o$ are brought into mesh without adjustment or securing means of any kind. The wheel can be removed from the spindle without disturbing the driven pinion in any way.

By means of this construction, the driving gear is secured to the rear of and has approximately the maximum diameter of the hub, thus permitting greater accuracy in the cutting of the gear teeth. This arrangement also permits the relation of the gearing to the operation of the speedometer or other registering device to be readily determined by the diameter of the wheel, thus permitting suitable increase or decrease in the driving gear in proportion to the size or diameter of the wheel without changing the size of the driven pinion. The gears and working parts are completely inclosed and are so located as to be practically free from accidental injury or displacement.

Although I have shown my improved construction used with a straight spindle, it is obvious that the same can be used with an off-set or inclined spindle, if desired, and that various changes and modifications may be made in the particular mechanism herein shown and described, provided the means set forth in the following claim be employed.

I claim as my invention:—

A demountable unit adapted to constitute a mounting for a driving mechanism, said unit comprising two elements, one a flat ring of relatively large diameter having internally projecting teeth on one side of said ring, and means including a smooth bearing surface at one side of said teeth for fastening the ring to an actuating member designed to close one open side of the ring, the other element being a flat cap having a peripheral flange telescoping said ring and in dust-tight sliding engagement therewith, means for mounting said cap, said cap coacting with said mounting to close the other open side of the ring, and a shaft bearing carried by said cap and adapted to support a member meshing with the teeth of the ring.

This specification signed and witnessed this 31st day of July, A. D., 1912.

JOHN G. PERRIN.

Signed in the presence of:—
F. C. CHANDLER,
O. E. DISTIN.